United States Patent
Fan et al.

(10) Patent No.: US 8,593,743 B2
(45) Date of Patent: Nov. 26, 2013

(54) MAGNETIC STRUCTURE FOR COMPACT IMAGING DEVICE

(75) Inventors: Kin Ming Fan, Kowloon (HK); Kwok Sing Cheng, New Territories (HK); Kai Cheong Kwan, Wong Tai Sin (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 159 days.

(21) Appl. No.: 13/186,288

(22) Filed: Jul. 19, 2011

(65) Prior Publication Data
US 2013/0021685 A1    Jan. 24, 2013

(51) Int. Cl.
G02B 7/02   (2006.01)
G11B 7/00   (2006.01)

(52) U.S. Cl.
USPC ........... 359/824; 359/814; 359/557; 359/696; 720/683; 396/55; 396/87; 348/208.4; 348/208.7; 348/208.11; 348/240.3; 324/207.2

(58) Field of Classification Search
USPC ......... 359/813, 814, 822–824, 557, 694–696; 324/207.2, 207.21, 207.24; 396/55, 396/72–79, 87, 133; 348/208.2–208.7, 348/208.11, 208.99, 240.3, 340, 360, 367; 29/428; 156/264
See application file for complete search history.

(56) References Cited

U.S. PATENT DOCUMENTS

| | | | |
|---|---|---|---|
| 4,868,802 A * | 9/1989 | Kobori | 369/13.32 |
| 5,105,405 A * | 4/1992 | Hashimoto et al. | 369/44.22 |
| 7,203,951 B2 * | 4/2007 | Kawano et al. | 720/683 |
| 7,457,061 B2 | 11/2008 | Sata et al. | |
| 7,518,812 B2 | 4/2009 | Sue et al. | |
| 7,577,346 B2 * | 8/2009 | Liao et al. | 396/55 |
| 8,027,579 B2 * | 9/2011 | Takizawa et al. | 396/55 |
| 8,059,952 B2 * | 11/2011 | Huang et al. | 396/55 |
| 8,259,218 B2 * | 9/2012 | Huang et al. | 348/360 |
| 8,279,289 B2 * | 10/2012 | Nagata et al. | 348/208.11 |
| 2008/0037143 A1 | 2/2008 | Yoon | |
| 2009/0219633 A1 | 9/2009 | Li et al. | |
| 2010/0033822 A1 | 2/2010 | Chang | |
| 2011/0267692 A1 * | 11/2011 | Watanabe et al. | 359/557 |
| 2012/0082442 A1 * | 4/2012 | Kwon et al. | 396/55 |

OTHER PUBLICATIONS

International Search Report, International Application No. PCT/CN2011/077378, Filed Jul. 20, 2011, Mailed May 3, 2012, pp. 1-5.
Notification of Transmittal of the International Search Report and the Written Opinion of the International Searching Authority or the Declaration, International Application No. PCT/CN2011/077378, Filed Jul. 20, 2011, Mailed May 3, 2012, pp. 1-3.
Written Opinion of the International Searching Authority, International Application No. PCT/CN2011/077378, Filed Jul. 20, 2011, Mailed May 3, 2012, pp. 1-4.

* cited by examiner

*Primary Examiner* — Loha Ben
(74) *Attorney, Agent, or Firm* — Berkeley Law & Technology Group, LLP

(57) ABSTRACT

The subject matter disclosed herein relates to electromagnetic force generation for an imaging device having a small form factor.

19 Claims, 8 Drawing Sheets

MAGNETIC STRUCTURE FOR COMPACT IMAGING DEVICE

FIELD

The subject matter disclosed herein relates to electromagnetic force generation for an imaging device having a small form factor.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can fit into limited space of the apparatuses.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
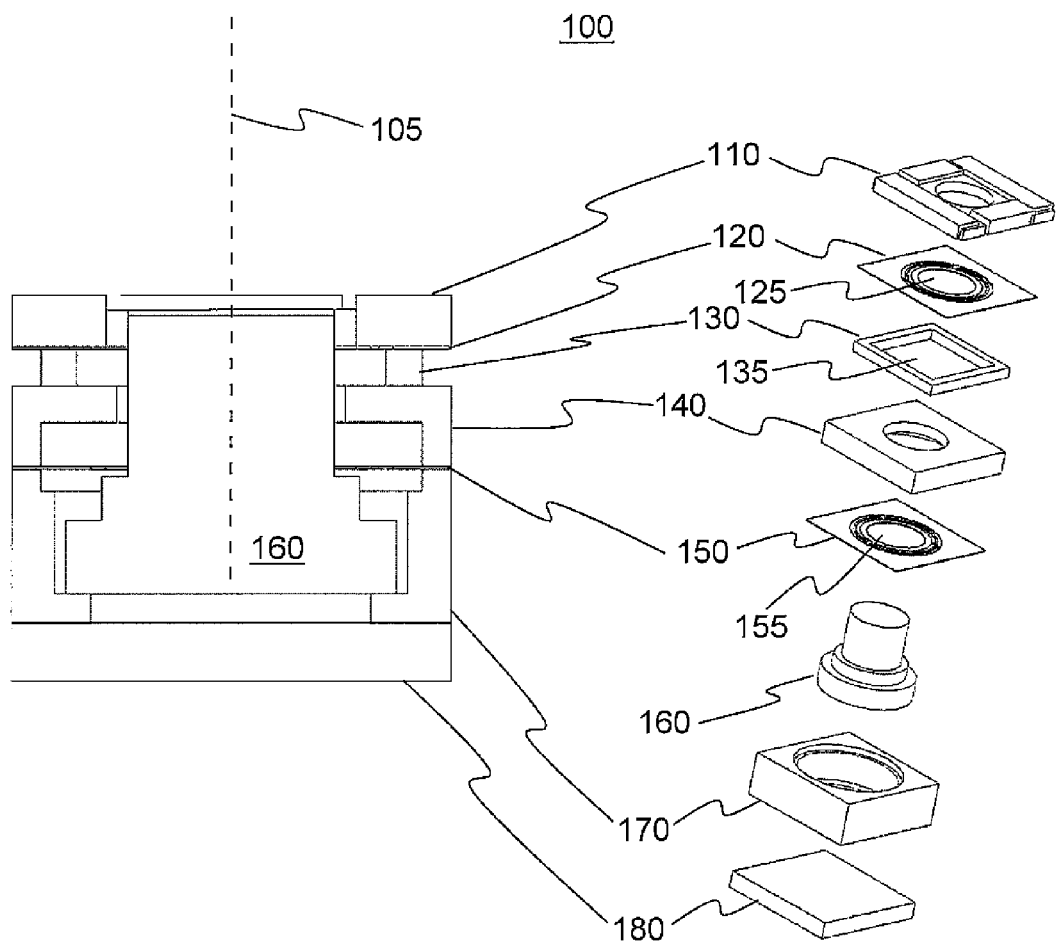
FIGS. 1 and 2 include perspective views and a cross-section view of components that comprise a compact imaging module, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Embodiments described herein include a compact imaging module that provides a mechanism and/or allows a process to adjust a distance between an imaging lens and an image sensor, wherein a footprint of the compact module may be the same as or less than a footprint of the image sensor, for example. In other words, a surface area of a compact imaging module need not extend beyond a surface area of an image sensor. For example, a footprint area of an image sensor may comprise a value of about 1.5 square millimeters. An area of a compact module mounted on and/or physically supported by such an image sensor may comprise a value of about 1.5 square millimeters or less.

A distance between a lens assembly and an image sensor may be adjustable, at least in part, in response to an electromagnetic force generated by one or more magnets and a coil, for example, wherein the distance may be measured along an optical axis of the lens assembly. In a particular embodiment, for example, a structure of a compact imaging module, such as a compact camera module, may provide auto-focus and/or other imaging functions by adjusting such a distance. A compact imaging module may provide an advantage to designers incorporating such a module into increasingly slimmer, smaller, and/or lighter portable electronic apparatuses, such as a compact camera, for example.

As used to describe such embodiments, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

In one embodiment, a compact imaging module may comprise a lens assembly including one or more lenses, an image sensor to receive light via the lens assembly, and an actuator to adjust a position of the lens assembly. In one implementation, an actuator may include one ring-shaped magnet and one coil to produce an electromagnetic force on the magnet. In another implementation, an actuator may include one or more pairs of magnets and one coil to produce an electromagnetic force on the magnets. Magnetic poles of magnets of such pairs may comprise mirror symmetry about an optical axis of a lens assembly, as described below.

In one implementation, an actuator may comprise one or more magnets and a coil to impart a magnetic force on a lens assembly. Such magnets, which may comprise permanent magnets, may have a flat or planar shape, for example. A coil may be a wound coil, printed coil, and/or an electroplated coil on a substrate. A compact imaging module may comprise a spring to provide a restoring force to the lens assembly. A surface area of an actuator need not extend substantially beyond a surface area of an image sensor. Such an actuator may be mounted on a surface of an image sensor.

In other implementations, a compact imaging module may include an actuator having a coil that moves with a lens assembly if the coil is energized with an electric current, while a magnet is stationary with respect to an image sensor. In another configuration, a compact imaging module may comprise an actuator having a coil and a magnet, wherein the magnet may move with a lens assembly if the coil is energized, while the coil remains stationary.

In one particular implementation, an actuator may comprise one or more magnets arranged in a plane perpendicular to an optical axis of a lens assembly. In another particular implementation, such an actuator may comprise a coil in a plane perpendicular to an optical axis of a lens assembly. Such a coil may be mounted on and/or sit on a lens assembly of a compact imaging module. As discussed in further detail below, a relationship between widths of individual magnets included in an actuator and a width of a coil in the actuator may determine magnitudes of electromagnetic forces generated by the actuator. For example, a ratio of a width of a magnet to a width of a coil may comprise a value between about 0.8 and about 1.6, though claimed subject matter is not so limited.

In an embodiment, a compact imaging module may be fabricated by mounting and/or coupling a lens assembly including one or more lenses to a portion of an actuator, and positioning an image sensor to receive light via the lens assembly. The actuator may include one or more leaf springs that are positioned between an image sensor and a lens assembly, and one or more leaf springs that are positioned between a coil and a magnet of the actuator. In one implementation, a lens assembly may include at least a portion disposed in a central cavity of an actuator and/or disposed between a central cavity of the actuator and an image sensor. In such embodiments, at least a portion of the actuator may be coupled to the image sensor. Of course, such details of a compact imaging module are merely examples, and claimed subject matter is not so limited.

An actuator may provide a relatively precise control of motion of a lens assembly, so that various imaging functions, such as focusing for example, may allow for improved image quality. An advantage of such a compact module is that its footprint may be equal to or smaller than a footprint of an image sensor, so that a surface area of the compact module may be relatively small. In contrast, a compact module that is larger than its image sensor may have a relatively large surface area. Moreover, a batch manufacturing process, described below, may be applied to fabricating such a compact module. For example, such a batch process may comprise a wafer level process to fabricate an actuator of a compact image sensor. Such a process may allow for a relatively high manufacturing efficiency, thus lowering manufacturing costs of a camera, for example, due to a focus variation function provided by the compact module.

Figure 2:
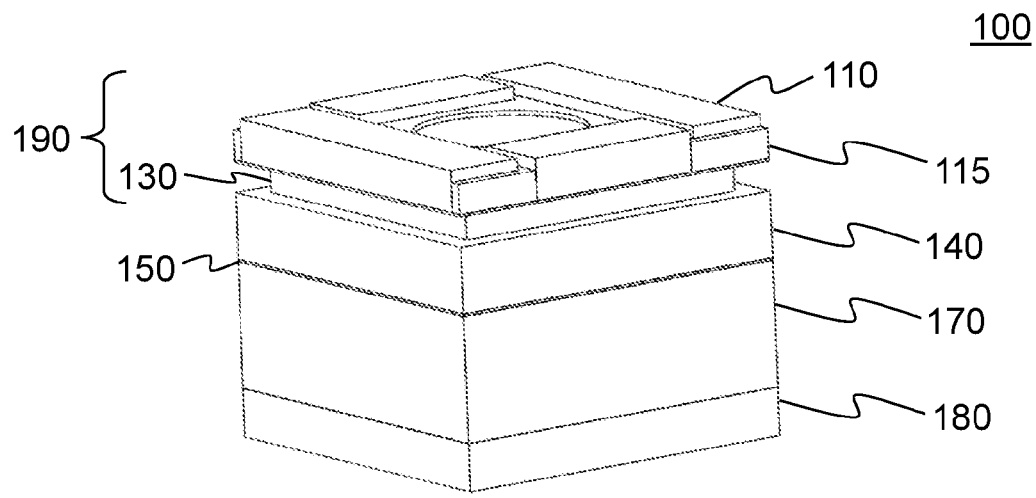

FIGS. 1 and 2 include perspective views and a cross-section view of components that comprise a compact imaging module 100, according to an embodiment. Such an imaging module may comprise an image sensor 180 including an active region (not shown) comprising an array of pixilated charge-coupled devices (CCD) and/or one or more complementary metal-oxide-semiconductor (CMOS) devices, just to name a couple of examples. Image sensor 180 may also comprise an inactive region (not shown) at least partially surrounding an active region. Such an inactive region may comprise a border or frame for an active region that may be used to physically support other portions of compact imaging module 100 without interfering with light impinging on the active region. For example, a portion of an actuator 190 (discussed below) may be mounted and/or coupled to an inactive region of image sensor 180, though claimed subject matter is not so limited.

In an embodiment, imaging module 100 may further comprise a lens assembly 160, which may include one or more lenses to provide an image onto an active region of image sensor 180. Such an image need not comprise visible wavelengths, but may also comprise infrared and/or ultraviolet wavelengths, for example. So that such an image may be focused onto an active region, actuator 190 may adjust a position of lens assembly 160 with respect to image sensor 180. In a particular implementation, actuator 190 may adjust a vertical position of at least a portion of lens assembly 160 with respect to image sensor 180. As mentioned above, such a lens assembly may comprise one or more lenses so that the vertical position of one or more of such lenses may be adjusted as a group. Lens assembly 160 may comprise an optical axis 105. In a particular implementation, actuator 190 may comprise one or more magnets 110, a magnet holder 115, a top leaf spring 120, and/or a coil 130. Magnet holder 115 may comprise a substantially planar holder that provides an area and/or space to accommodate one or more magnets.

Coil 130 may comprise one or more conducting coils mounted on a substrate. For example, coil 130 may comprise multiple loops of wire in one or more layers of such a substrate. An electrical current travelling through such loops may induce a magnetic field to impart a force on one or more magnets, such as magnets 110, for example. In such a case, spring 120 may provide a restoring force to counter such a magnetic force, thereby providing a mechanism to adjust a vertical position of lens assembly 160 with respect to image sensor 180. Coil 130 may further comprise an aperture 135 to allow light along an optical axis 105 to travel past coil 130. Electrical leads (not shown) may provide electrical signals to coil 130. Such leads may comprise a flexible conductor, such as a ribbon, one or more wires, and so on. Though not shown, coil 130 may include electrical connection areas where electrical current may be transferred from electrical leads to coil 130 or vise versa. Of course, such details of coil 130 are merely examples, and claimed subject matter is not so limited.

In one implementation, coil 130 may comprise a PCB coil, which may or may not comprise a multi-layer flexible PCB coil. Such a PCB coil may comprise a flexible PCB coil, for example. In another implementation, coil 130 may comprise a wound coil, though claimed subject matter is not so limited. A PCB coil may provide a number of benefits or advantages over a wound coil. For example, a PCB coil may be fabricated with relatively tight dimensional tolerances and may be freestanding without a need for a fixture, frame, or host. A PCB coil may be batch processed and may be relatively thin compared to a wound coil. PCB coils may be designed in a large variety of shapes and sizes. Such PCB coils may also be relatively easily designed and/or fabricated to include multiple layers to produce sufficient magnet flux.

Springs 120 and/or 150 may comprise leaf springs, which may include a central portion and an arm portion (not shown) adapted to move or flex as a spring. For example, such a central portion and an arm portion may provide a restoring force if the central portion and the arm portion are displaced from a neutral configuration. A fixed portion may comprise an outer portion of springs 120 and/or 150 which may be fixedly mounted to one or more components of compact imaging module 100. For example, such a central portion and an arm portion may flex in a spring-like manner while the fixed portion is held in a relatively fixed position. Springs 120 and/or 150 may further comprise apertures 125 and 155 to allow light along optical axis 105 to travel past springs 120 and 150. Of course, such details of springs 120 and 150 are merely examples, and claimed subject matter is not so limited.

Though magnets 110 are shown in FIGS. 1 and 2 to include four portions, claimed subject matter is not so limited. Also, magnet holder 115 may or may not be included in an embodiment of an imaging module. For example, two or more magnets may be assembled to one another without use of a magnet holder. Imaging module 100 may further comprise a spacer 170 disposed between a bottom leaf spring 150 and image sensor 180, and spacer 140 between spring 120 and bottom leaf spring 150 for example. Of course, such details of imaging module 100 are merely examples, and claimed subject matter is not so limited.

Figure 3:
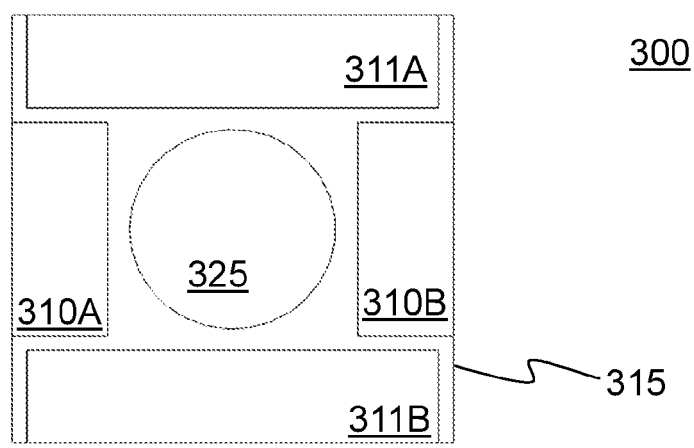
FIG. 3 is a top view of a compact imaging module, according to an embodiment.
Figure 7:
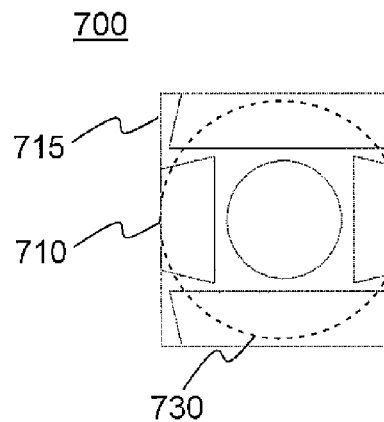
FIGS. 7 and 8 are top views of magnets and magnet holders, according to embodiments.
Figure 8:
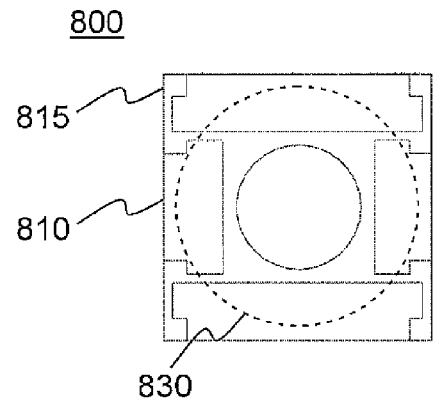
Figure 10:
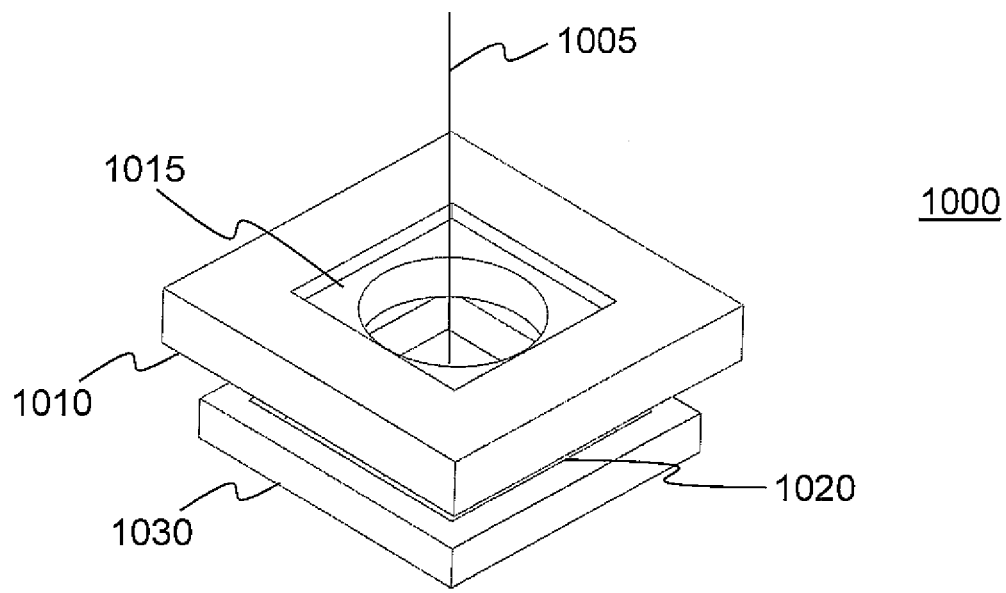
FIG. 10 is a perspective view of a portion of an actuator, according to another embodiment.
Figure 11:
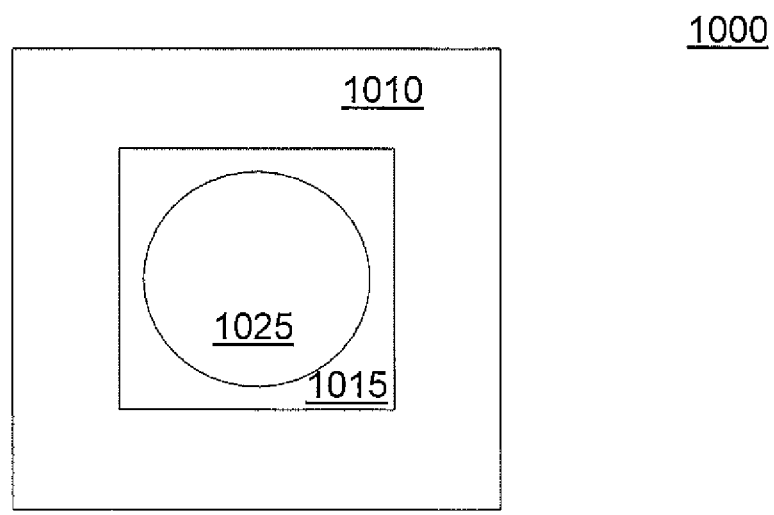
FIG. 11 is a top view of a portion of an actuator, according to an embodiment.
Figure 12:
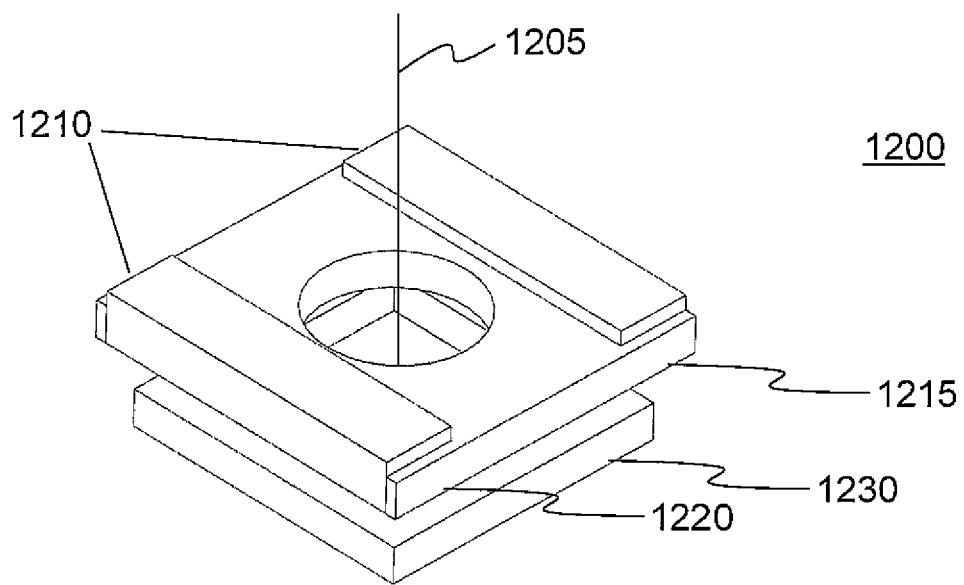
FIG. 12 is a perspective view of a portion of an actuator, according to yet another embodiment.
Figure 13:
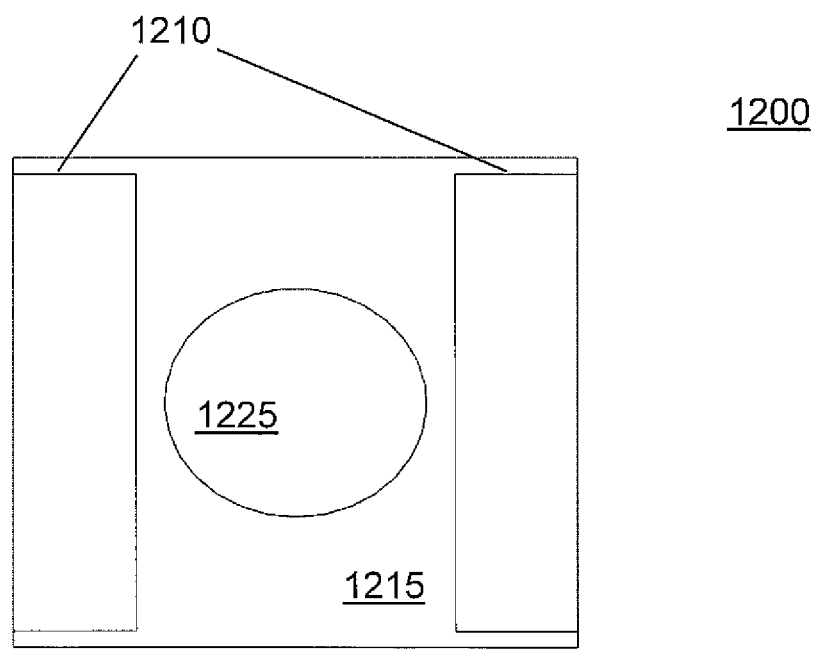
FIG. 13 is a top view of a portion of an actuator, according to yet another embodiment.

FIG. 3 is a top view of a compact imaging module 300 showing a magnet holder 315 and magnets 310A, 310B, 311A, and 311B according to an embodiment. An aperture 325 may allow light along an optical axis of module 300 to travel past magnet holder 315. Individual magnets may comprise various shapes in different embodiments (e.g., as shown in FIGS. 7 and 8). In FIG. 3, for example, magnets 310A, 310B, 311A, and 311B may comprise a rectangular shape. Magnet holder 315, which may comprise a non-magnetic material, may physically support magnets 310A, 310B, 311A, and 311B. Non-magnetic materials may include plastic, copper, and aluminum, just to name a few examples. Though not shown, magnet holder 315 may comprise U-shaped recessed regions where magnets 310A, 310B, 311A, and 311B may be placed. Compact imaging module 300 may comprise a first pair of magnets 310A and 310B and a second pair of magnets 311A and 311B. A first pair of magnets 310A and 310B may have a shorter length than a second pair of magnets 311A and 311B, for example. In other embodiments, a compact imaging module may comprise one magnet (e.g., as shown in FIGS. 10 and 11) or one pair of magnets (e.g., as shown in FIGS. 12 and 13). In an embodiment, one coil may be used for one or more magnets in an actuator, as explained below. A geometric plane of magnets 310A, 310B, 311A, and 311B may be perpendicular to an optical axis of module 300.

Figure 4:
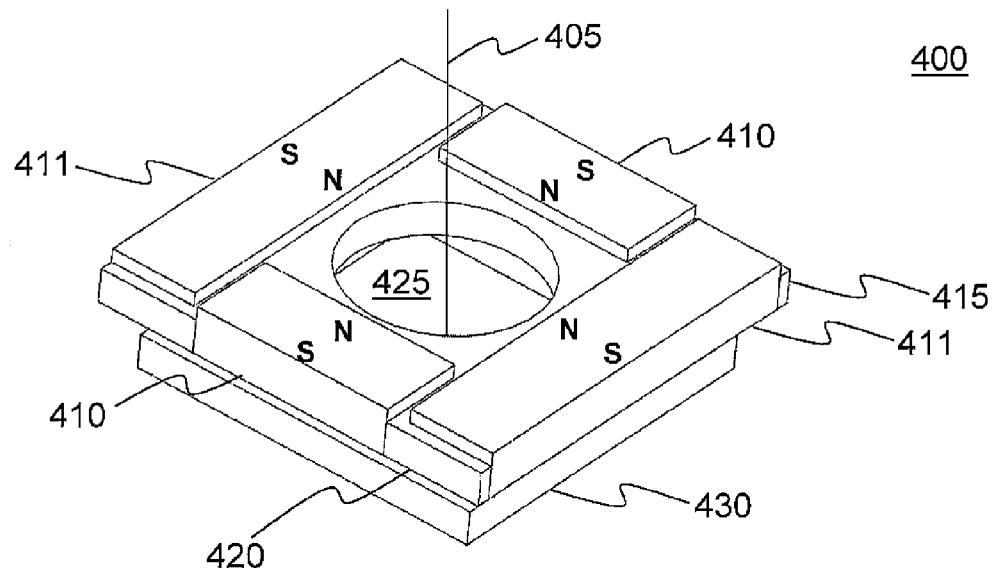
FIG. 4 is a perspective view of an actuator, according to an embodiment.

FIG. 4 is a perspective view of an actuator 400, according to an embodiment. A magnet holder 415 may include a first pair of magnets 410 and a second pair of magnets 411 above a coil 430. A top spring 420 may be disposed between coil 430 and magnet holder 415. An aperture 425 may allow light travelling along optical axis 405 to pass though top spring 420, coil 430, and magnet holder 415. As mentioned above, such an optical axis may comprise an axis of a lens assembly, such as 160 shown in FIG. 1, for example. Magnetic poles of magnets of pairs 410 and 411 may comprise mirror symmetry about optical axis 405. For example, magnets may be arranged so that relative positions of north and south poles of the magnets are located in a manner that is the same in any direction relative to optical axis 405. As shown in FIG. 4, north magnetic poles of magnets of pairs 410 and 411 are closest to optical axis 405 compared to south magnetic poles. In one implementation, alignment of magnetic poles of individual magnets is perpendicular to the optical axis of the lens assembly. For example, north and south magnetic poles of individual magnets of magnet pairs 410 and 411 may be aligned with respect to one another in a direction perpendicular to axis 405. Such an arrangement of magnetic poles may provide an electromagnetic force to adjust a position of a lens assembly in response to a current in coil 430. As discussed in further detail below, such an electromagnetic force may comprise a sum of electromagnetic forces generated in two regions. In a first region inside coil 430, a magnetic flux produced by coil 430 may act on north poles of magnets pairs 410 and 411. In a second region outside coil 430, a magnetic flux produced by coil 430 may act on south poles of magnets pairs 410 and 411. Accordingly, positions of north and south poles of magnets 410 and 411 (and thus concomitant positions and/or sizes of magnets 410 and 411) relative to coil 430 may be selected to provide desirable magnitudes of electromagnetic forces between the magnets and the coil. Details of such positions are described below.

Figure 5:
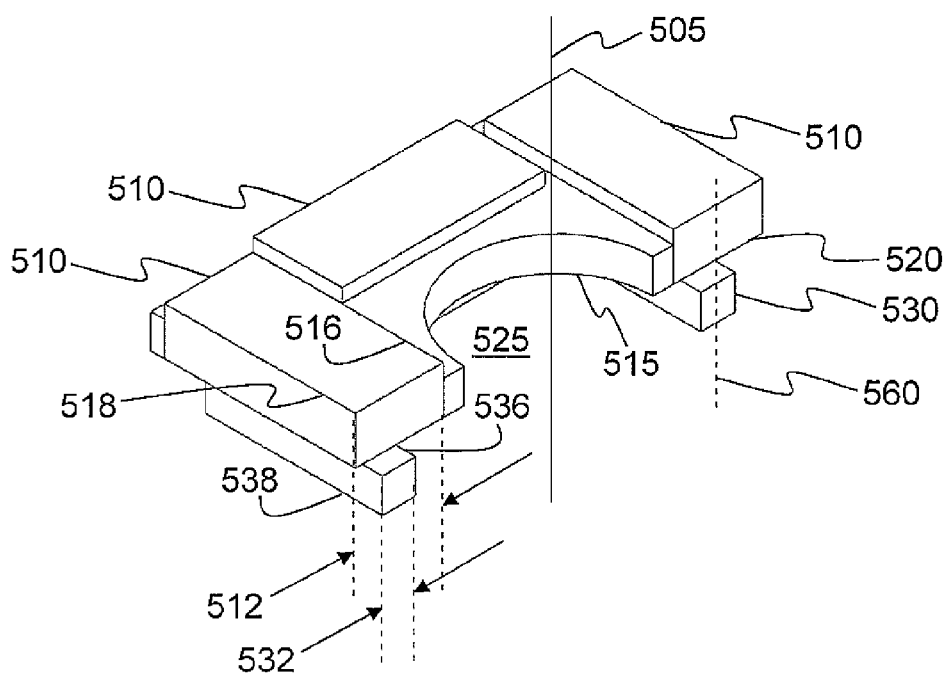
FIG. 5 is a perspective view of a portion of an actuator, according to an embodiment.

FIG. 5 is a perspective view of a cross-section of a portion of an actuator, such as actuator 400, according to an embodiment. A magnet holder 515 may include magnets 510. A top spring 520 may be disposed between a coil 530 and magnet holder 515. An aperture 525 may allow light travelling along optical axis 505 to pass though top spring 520, coil 530, and magnet holder 515. As shown in FIG. 5, a magnet width 512 may be defined as a distance between first magnet edge 516 and second magnet edge 518. Similarly, a coil width 532 may be defined as a distance between first coil edge 536 and second coil edge 538. As mentioned above, positions and/or sizes of magnets 510 relative to coil 530 may be selected to provide desirable magnitudes of electromagnetic forces between the magnets and the coil. Magnitudes of such electromagnetic forces may be based, at least in part, on an amount of coupling (e.g. overlap) between magnetic flux of magnets and magnetic flux of a coil, for example. In one implementation, magnets 510 may be located so that center axes 560 of individual magnets 510 and coil 530 are substantially aligned with one another, as shown in FIG. 5. In another implementation, a ratio of magnet width 512 to coil width 532 may comprise a particular value. For a particular example, such a ratio may comprise a value from about 0.8 to about 1.6. Outside this range of values, relatively inefficient coupling between magnetic flux of magnets and magnetic flux of a coil may lead to increased rotational moments affecting portions of the actuator. For example, a rotational moment may increase a tilt angle of the optical system during operation.

Figure 6:
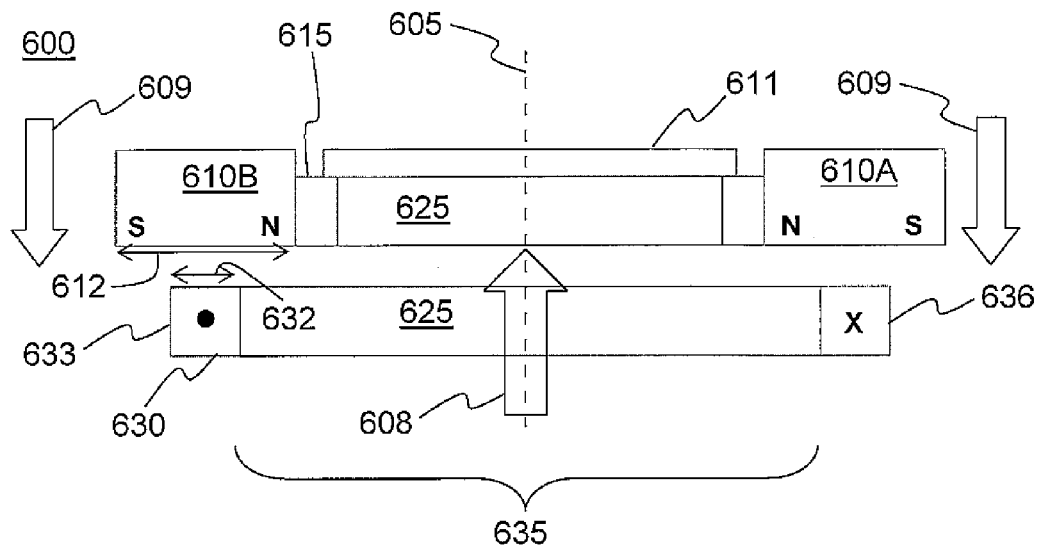
FIG. 6 is a cross-section view of an actuator, according to an embodiment.

FIG. 6 is a cross-section view of a portion of an actuator 600, according to an embodiment. A magnet holder 615 may include a pair of magnets comprising magnets 610A and 610B (FIG. 6 also includes a partial view of a magnet 611 of another magnet pair). A top spring (not shown in FIG. 6), such as top spring 420 shown in FIG. 4, for example, may be disposed between a coil 630 and magnet holder 615. Apertures 625 disposed in magnet holder 615 and coil 630 may allow light travelling along optical axis 605 to pass though coil 630 and magnet holder 615.

Coil 630 may comprise one or more conducting coils mounted on a substrate. For example, coil 630 may comprise multiple loops of wire in one or more layers of such a substrate. An electrical current travelling through such loops may induce a magnetic field to impart a force on magnets 610A and 610B (and magnet 611), as discussed above. As shown in cross-section in FIG. 6, coil 630 may comprise a portion 633 and a portion 636. As indicated by a solid circle in portion 633, one or more conductors in portion 633 may carry electrical current in a direction out of the drawing of FIG. 6. As indicated by a "X" in portion 636, one or more conductors in portion 636 may carry the electrical current in a direction into the drawing of FIG. 6. Thus, in this particular example, magnetic flux produced by the current-carrying coil 630 may be directed upward, as indicated by arrow 608. Such upward magnetic flux may be substantially located in an inside region 635 so that an upward magnetic force may be imparted on north poles (indicated by "N" in FIG. 6) of magnets 610A and 610B (and magnet 611). Meanwhile, magnetic flux produced by the current-carrying coil 630 may be directed downward, as indicated by arrows 609. Such downward magnetic flux may be substantially located outside region 635 so that an upward magnetic force may be imparted on south poles (indicated by "S" in FIG. 6) of magnets 610A and 610B (and magnet 611). Upward flux inside region 635 acting on north poles of magnets may produce a magnetic force in a same (upward) direction as that of downward flux outside region 635 acting on south poles of the magnets. Accordingly, flux inside region 635 and flux outside region 635 may both contribute to a summed force on the magnets.

As discussed above, positions of north and south poles of magnets relative to coil 630 may be selected to provide desirable magnitudes of electromagnetic forces between the magnets and the coil. Accordingly, positions and/or sizes of individual magnets relative to coil 630 may be selected to provide desirable magnitudes of electromagnetic forces between the magnets and the coil. As discussed above, magnitudes of such electromagnetic forces may be based, at least in part, on an amount of coupling (e.g. overlap) between north/south poles of magnets and magnetic flux of a coil, for example. As defined above in a discussion of FIG. 5, a ratio of magnet width 612 to coil width 632 may comprise a particular value, such as a value from about 0.8 to about 1.6. Outside this range of values, relatively inefficient coupling between poles of magnets and magnetic flux of a coil may lead to values of electromagnetic forces between the magnets and the coil that are less than desirable.

An actuator may produce varying magnitudes of electromagnetic forces based, at least in part, on a varying magnitude of electrical current travelling in coil 630. Such varying magnitudes may provide varying distances between a lens assembly and an image sensor (e.g., lens assembly 160 and image sensor 180, shown in FIG. 1) to precisely control a focus of light onto the image sensor. For example, a distance between a lens assembly and an image sensor may be based, at least in part, on a magnetic field, wherein such a distance is measured along an optical axis of a lens assembly. Of course, such details of actuator 600 are merely examples, and claimed subject matter is not so limited.

FIGS. 7 and 8 are top views of magnets and magnet holders that may be used in actuators of compact imaging modules, according to embodiments. In embodiment 700, a magnet holder 715 may include trapezoidal-shaped magnets 710. In embodiment 800, a magnet holder 815 may include magnets 810 that include a notch in a corner region. Selection of such shapes of magnets 710 and 810 may arise by considering that magnetic flux generated by a current-carrying coils (not shown in FIG. 7 or 8) may be distributed in substantially circular cross-sections 730 and 830, for example. Thus, corners portions of magnets furthest from such a region of magnetic flux may have a negligible affect on electromagnetic forces between the magnets and current-carrying coils. Accordingly, magnet shapes of magnets 715 and 815 need not include such corner portions.

Figure 9:
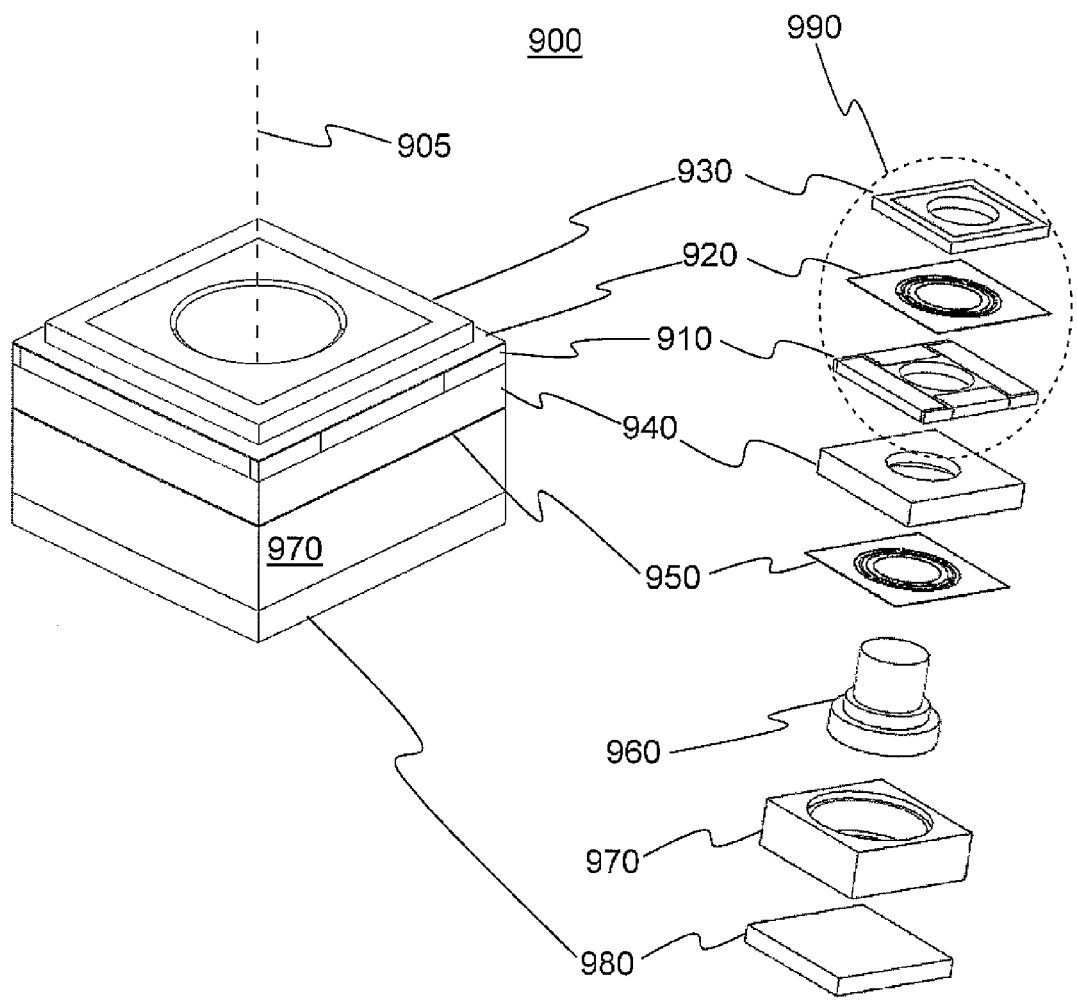
FIG. 9 is a perspective view of components that comprise a compact imaging module, according to another embodiment.

FIG. 9 is a side view and perspective view of components that comprise a compact imaging module 900, according to an embodiment. Such an imaging module may be similar to imaging module 100 shown in FIG. 1 except that relative positions of coil 130 and magnet 110 of actuator 190 may be interchanged in actuator 990, for example. Similar to imaging module 100, imaging module 900 may comprise an image sensor 980 comprising an active region and an inactive region (not shown) at least partially surrounding the active region. Such an inactive region may comprise a border or frame of an active region, and may be used to physically support other portions of compact imaging module 900. For example, a portion of spacer 970 may be mounted and/or coupled to such an inactive region of image sensor 980, though claimed subject matter is not so limited.

In an embodiment, imaging module 900 may further comprise a lens assembly 960, which may include one or more lenses to project an image onto an active region of image sensor 980. As explained above, so that such an image is focused onto image sensor 980, actuator 990 may adjust a position of lens assembly 960 with respect to image sensor 980. In a particular implementation, actuator 990 may adjust a vertical position of at least a portion of lens assembly 960 with respect to image sensor 980. As mentioned above, such a lens assembly may comprise one or more lenses so that the vertical position of one or more of such lenses may be adjusted as a group. In a particular implementation, actuator 990 may comprise magnets and magnet holder 910 below a coil 930, and/or a top leaf spring 920. Imaging module 900 may further comprise a spacer 970 disposed between a bottom leaf spring 950 and image sensor 980, for example. Spacer 940 may be disposed between magnets and magnet holder 910 and lower leaf spring 950.

FIG. 10 is a perspective view of a portion of a compact imaging module 1000 and FIG. 11 is a top view of module 1000, according to an embodiment. Such an imaging module may be similar to imaging module 100 shown in FIG. 2 except that magnet 1010 comprises a single ring-shaped magnet. For example, a ring-shaped magnet may comprise a square or rectangular shape in a top view, including an open area in a central region to allow light along optical axis 1005 to travel past the ring-shaped magnet. In another example, a ring-shaped magnet may comprise a circular or triangular shape in a top view, including an open area in a central region. Of course, other ring-shaped geometries may be used, and claimed subject matter is not so limited. Magnet 1010 may be physically supported by a magnet holder 1015. A leaf spring 1020 may be disposed between magnet holder 1015 and a coil 1030. Compact imaging module 1000 may comprise an aperture 1025 to allow light along optical axis 1005 to travel past magnet 1010, coil 1030, and magnet holder 1015. Of course, such details of compact imaging module 1000 are merely examples, and claimed subject matter is not so limited.

FIG. 12 is a perspective view of a portion of a compact imaging module 1200 and FIG. 13 is a top view of module 1200, according to an embodiment. Such an imaging module may be similar to imaging module 100 shown in FIG. 2 except that magnet 1210 comprises a single pair of magnets. Magnet pair 1210 may be physically supported by a magnet holder 1215. A leaf spring 1220 may be disposed between magnet holder 1215 and a coil 1230. Compact imaging module 1200 may comprise an aperture 1225 to allow light along optical axis 1205 to travel past magnet 1210, coil 1230, and magnet holder 1215. Of course, such details of compact imaging module 1200 are merely examples, and claimed subject matter is not so limited.

Figure 14:
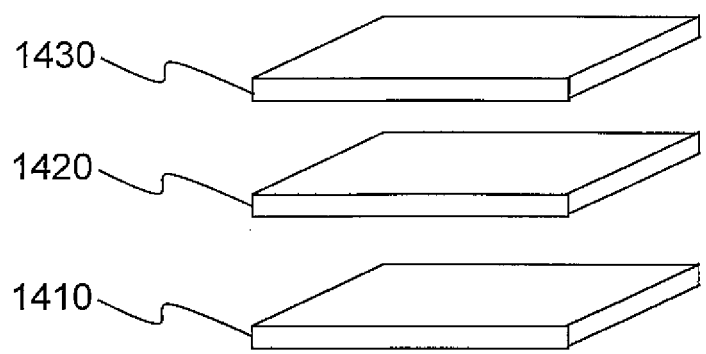
FIGS. 14-16 show various stages of a batch process to fabricate multiple actuators, according to an embodiment.
Figure 15:
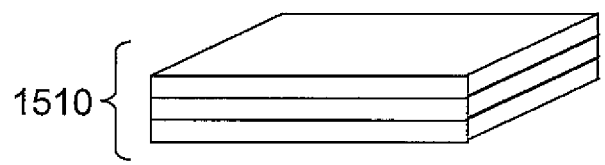
Figure 16:
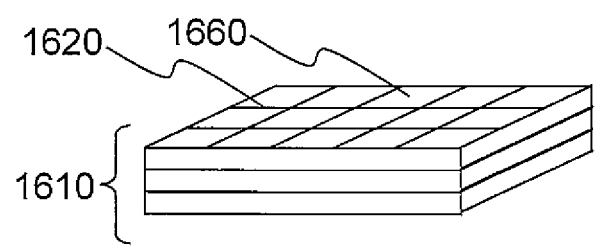

FIGS. 14-16 show various stages of a batch process to fabricate multiple actuators, such as actuators 190 and/or 990 shown in FIGS. 1 and 9, respectively, according to an embodiment. In particular, FIG. 14 is a perspective view of components to fabricate an actuator, according to an embodiment. Such components may comprise a PCB coil sheet 1430, a planar spring (e.g., a leaf spring) sheet 1420, and/or a magnet sheet 1410. Here, "sheet" refers to a relatively thin layer that may comprise multiple components. For example, magnet sheet 1410 may comprise multiple individual magnets arranged substantially in an array, planar spring sheet 1420 may comprise multiple individual planar springs arranged substantially in an array, and PCB coil sheet 1430 may comprise multiple individual PCB coils arranged substantially in an array. In a relatively early stage of fabrication, such sheets may be lined up relative to one another and laminated together to form an array 1510 of individual actuator, as shown in FIG. 15. Subsequently, such individual actuators may be separated from one another by cutting actuator array 1510 substantially along edges of the individual actuators. For example, FIG. 16 shows an array 1610 of individual actuators 1660 having edges 1620, where such cutting may be performed to separate actuators 1660. Subsequently, though not shown, separated actuators 1660 may be mounted and/or coupled to image sensors during a process of assembling a compact imaging module. Lens assemblies may then be mounted to actuators 1660 so that a first portion of the lens assemblies is disposed in a central cavity of the actuators and a second portion of the lens assemblies is disposed between the central cavity of the actuators and the image sensors, wherein the first portion has a smaller diameter than that of the second portion, as described above. Of course, such details of a fabricating process of a compact imaging module are merely examples, and claimed subject matter is not so limited.

One skilled in the art will realize that a virtually unlimited number of variations to the above descriptions is possible, and that the examples and the accompanying figures are merely to illustrate one or more particular implementations.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
  a lens assembly including one or more lenses;
  an image sensor to receive light from said lens assembly; and
  an actuator to adjust a position of said lens assembly, said actuator including at least one pair of magnets and a coil to produce an electromagnetic force on said lens assembly, wherein magnetic poles of said at least one pair of magnets comprise mirror symmetry about an optical axis of said lens assembly, wherein a geometric plane of said at least one pair of magnets and a geometric plane of said coil are perpendicular to said optical axis, and wherein alignment of said magnetic poles of said at least one pair of magnets is perpendicular to said optical axis.

2. The apparatus of claim 1, wherein said actuator includes exactly one coil to produce a magnetic field on said magnetic poles of said at least one pair of magnets.

3. The apparatus of claim 2, wherein said at least one pair of magnets is moveable with said lens assembly in response to said coil being energized.

4. The apparatus of claim 2, wherein said coil is moveable with said lens assembly in response to said coil being energized.

5. The apparatus of claim 2, wherein said at least one pair of magnets is above or below said coil.

6. The apparatus of claim 2, and wherein a ratio of a width of each of said at least one pair of magnets to a width of said coil comprises a value between about 0.8 and 1.6.

7. The apparatus of claim 1, wherein said actuator is mounted on a surface of said image sensor, which physically supports said actuator.

8. The apparatus of claim 1, further comprising a magnet holder to fixedly secure said at least one pair of magnets, wherein said magnet holder comprises a non-magnetic material.

9. The apparatus of claim 8, wherein said magnet holder comprises U-shaped recessed regions where said at least one pair of magnets is disposed.

10. The apparatus of claim 1, wherein individual magnets of said at least one pair of magnets comprise a trapezoidal shape.

11. The apparatus of claim 1, wherein individual magnets of said at least one pair of magnets comprise a notch in a corner region of said individual magnets.

12. The apparatus of claim 1, wherein said at least one pair of magnets comprises a ring shape.

13. The apparatus of claim 1, wherein a distance between said lens assembly and said image sensor is adjustable, at least in part, in response to said electromagnetic force, and wherein said distance is measurable along said optical axis of said lens assembly.

14. A method comprising:
  mounting a lens assembly including one or more lenses to a portion of an actuator that includes at least one pair of magnets to produce an electromagnetic force on said lens assembly; and
  mounting said actuator on an image sensor to receive light from said lens assembly, wherein magnetic poles of said at least one pair of magnets comprise mirror symmetry about an optical axis of said lens assembly, wherein a geometric plane of said at least one pair of magnets, and a geometric plane of a coil of said at least one pair of magnets are perpendicular to said optical axis, and wherein alignment of said magnetic poles of said at least one pair of magnets is perpendicular to said optical axis.

15. The method of claim 14, wherein said actuator includes exactly one coil to produce a magnetic field on said magnetic poles of said at least one pair of magnets.

16. The method of claim 14, further comprising fixedly mounting said at least one pair of magnets on a magnet holder, wherein said magnet holder comprises a non-magnetic material.

17. The method of claim 14, wherein a ratio of a width of each of said at least one pair of magnets to a width of said coil of said at least one magnet comprises a value between approximately 0.8 and approximately 1.6.

18. A method comprising:
forming an actuator wafer comprising multiple actuators by laminating together:
an array of printed circuit board (PCB) coils;
an array of leaf springs; and
an array of magnets;
cutting said actuator wafer to isolate said multiple actuators from one another, each of said isolated actuators comprising one PCB coil of said array of said PCB coils, one leaf spring of said array of leaf springs, and at least one pair of magnets of said array of magnets;
coupling each of said isolated actuators to at least one image sensor; and
mounting a lens assembly of each of said isolated actuators so that magnetic poles of said at least one pair of magnets comprise mirror symmetry about an optical axis of said lens assembly.

19. The method of claim 18, wherein a ratio of a width of each of said at least one pair of magnets to a width of one of said PCB coils comprises a value between approximately 0.8 and approximately 1.6.

* * * * *

US008593743C1

(12) EX PARTE REEXAMINATION CERTIFICATE (33rd)
Ex Parte Reexamination Ordered under 35 U.S.C. 257

United States Patent
Fan et al.

(10) Number: US 8,593,743 C1
(45) Certificate Issued: Jul. 17, 2015

(54) MAGNETIC STRUCTURE FOR COMPACT IMAGING DEVICE

(75) Inventors: Kin Ming Fan, Kowloon (HK); Kwok Sing Cheng, New Territories (HK); Kai Cheong Kwan, Wong Tai Sin (HK)

(73) Assignee: HONG KONG APPLIED SCIENCE AND TECHNOLOGY RESEARCH INSTITUTE CO. LTD., Hong Kong Science Park, Shatin, New Territories (HK)

Supplemental Examination Request:
No. 96/000,075, Dec. 2, 2014

Reexamination Certificate for:
Patent No.: 8,593,743
Issued: Nov. 26, 2013
Appl. No.: 13/186,288
Filed: Jul. 19, 2011

(51) Int. Cl.
*G11B 7/00* (2006.01)
*G02B 7/02* (2006.01)

(52) U.S. Cl.
CPC .................................... *G02B 7/021* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,075, please refer to the USPTO's public Patent Application Information Retrieval (PAIR) system under the Display References tab.

*Primary Examiner* — Linh M Nguyen

(57) ABSTRACT

The subject matter disclosed herein relates to electromagnetic force generation for an imaging device having a small form factor.

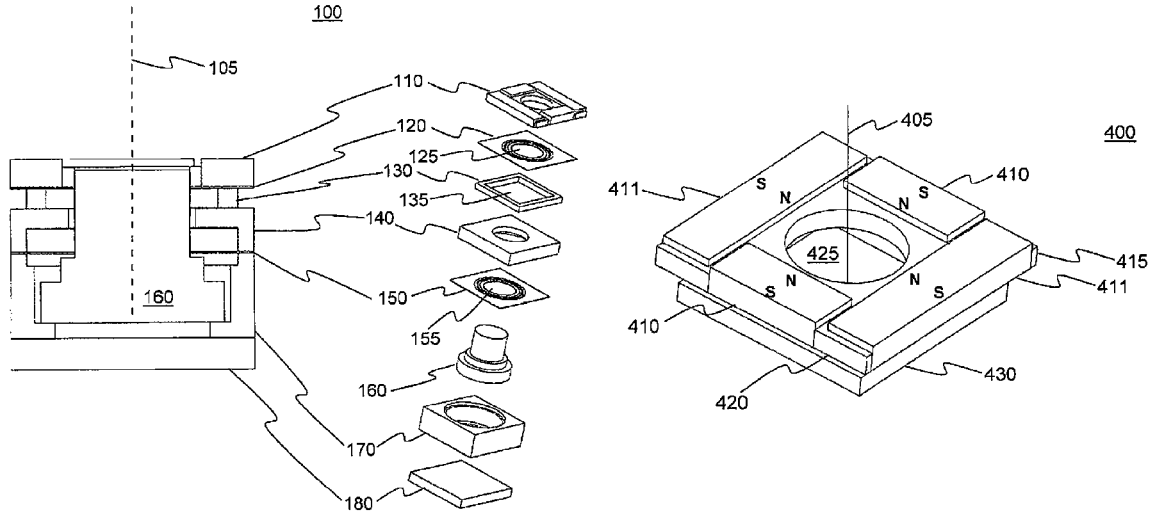

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14 and 18 are determined to be patentable as amended.

Claims 2-13, 15-17 and 19, dependent on an amended claim, are determined to be patentable.

New claims 20-30 are added and determined to be patentable.

1. An apparatus comprising:
   a lens assembly including one or more lenses;
   an image sensor to receive light from said lens assembly; and
   an actuator to adjust a position of said lens assembly, said actuator including at least one pair of magnets and a coil to produce an electromagnetic force on said lens assembly, wherein magnetic poles of said at least one pair of magnets comprise mirror symmetry about an optical axis of said lens assembly, wherein a geometric plane of said at least one pair of magnets and a geometric plane of said coil are perpendicular to said optical axis, and wherein alignment of said magnetic poles of said at least one pair of magnets is perpendicular to said optical axis, *wherein said image sensor includes an active region and an inactive region at least partially surrounding said active region, wherein a portion of said actuator is coupled to said inactive region of said image sensor, wherein said image sensor physically supports said actuator such that a footprint of said actuator is smaller than a footprint of said image sensor.*

14. A method comprising:
    mounting a lens assembly including one or more lenses to a portion of an actuator that includes at least one pair of magnets to produce an electromagnetic force on said lens assembly; and
    mounting said actuator on an image sensor to receive light from said lens assembly, wherein magnetic poles of said at least one pair of magnets comprise mirror symmetry about an optical axis of said lens assembly, wherein a geometric plane of said at least one pair of magnets, and a geometric plane of a coil of said at least one pair of magnets are perpendicular to said optical axis, and wherein alignment of said magnetic poles of said at least one pair of magnets is perpendicular to said optical axis, *wherein said image sensor includes an active region and an inactive region at least partially surrounding said active region, wherein a portion of said actuator is mounted to said inactive region of said image sensor, wherein said image sensor physically supports said actuator such that a footprint of said actuator is smaller than a footprint of said image sensor.*

18. A method comprising:
    forming an actuator wafer comprising multiple actuators by laminating together:
      an array of printed circuit board (PCB) coils;
      an array of leaf springs; and
      an array of magnets;
    cutting said actuator wafer to isolate said multiple actuators from one another, each of said isolated actuators comprising one PCB coil of said array of said PCB coils, one leaf spring of said array of leaf springs, and at least one pair of magnets of said array of magnets;
    coupling each of said isolated actuators to at least one image sensor; and
    mounting a lens assembly of each of said isolated actuators so that magnetic poles of said at least one pair of magnets comprise mirror symmetry about an optical axis of said lens assembly,
    *wherein said at least one image sensor including an active region and an inactive region at least partially surrounding said active region, wherein a portion of each of said isolated actuators is coupled to said inactive region of said at least one image sensor, wherein said at least one image sensor physically supports each of said isolated actuators such that a footprint of each of said isolated actuators is smaller than a footprint of said at least one image sensor.*

20. *The apparatus of claim 1, wherein said actuator comprises a laminated structure, said coil and said at least one pair of magnets being layers in said laminated structure.*

21. *The apparatus of claim 1, wherein said coil is a Printed Circuit Board (PCB) coil.*

22. *The apparatus of claim 1, wherein a first portion of said lens assembly is disposed in a central cavity of said actuator and a second portion of said lens assembly is disposed between said central cavity of said actuator and said image sensor, said first portion of said lens assembly having a smaller diameter than that of said second portion of said lens assembly.*

23. *The apparatus of claim 1, wherein individual magnets of said at least one pair of magnets is adapted to have a shape based on magnetic flux generated by said coil.*

24. *The apparatus of claim 1, wherein said at least one pair of magnets comprise a first pair of magnets and a second pair of magnets, said first pair of magnets having a length shorter than said second pair of magnets.*

25. *The apparatus of claim 1, wherein said footprint of said actuator is smaller than 1.5 square millimeters.*

26. *The apparatus of claim 8, wherein said magnet holder is a planar holder.*

27. *The method of claim 14, further comprising:
    disposing a first portion of said lens assembly in a central cavity of said actuator; and
    disposing a second portion of said lens assembly between said central cavity of said actuator and said image sensor, said first portion of said lens assembly having a smaller diameter than that of said second portion of said lens assembly.*

28. *The method of claim 14 further comprising:
    adapting individual magnets of said at least one air of magnets to have a shape based on magnetic flux generated by said coil.*

29. *The method of claim 14, wherein said footprint of said actuator is smaller than 1.5 square millimeters.*

30. *The method of claim 18, wherein said footprint of said actuator is smaller than 1.5 square millimeters.*

* * * * *